Figure 1:
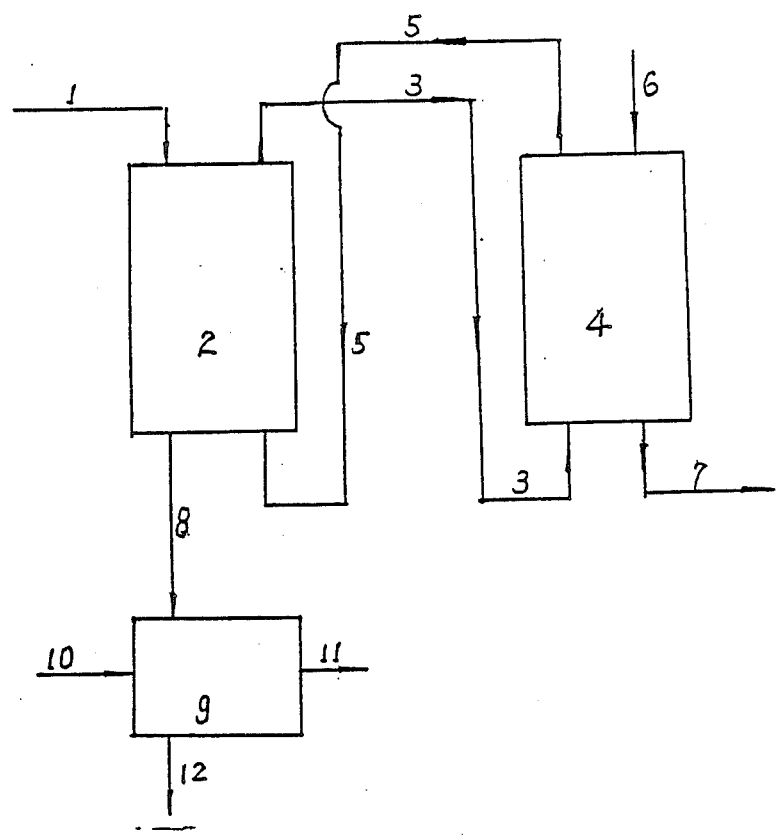

United States Patent [19]

Yu-Ming et al.

[11] Patent Number: 4,781,905
[45] Date of Patent: Nov. 1, 1988

[54] PROCESS FOR PRODUCING PHOSPHORIC ACID AND/OR PHOSPHATES FROM WET-PROCESS PHOSPHORIC ACID AND AN EXTRACTANT THEREIN

[76] Inventors: Jiang Yu-Ming; Su Yuan-Fu, both of East China Institute of Chemical Technology, 130 Meilong Road, Shanghai, China

[21] Appl. No.: 869,192

[22] Filed: May 30, 1986

[51] Int. Cl.$^4$ .............................................. C01B 25/16
[52] U.S. Cl. .................. 423/321 S; 423/309; 423/310
[58] Field of Search ............... 423/321 R, 321 S, 320, 423/309, 310

[56] References Cited

U.S. PATENT DOCUMENTS 4,279,876 7/1986 Schrodter et al. ............... 423/321 S

FOREIGN PATENT DOCUMENTS 2519814 11/1976 Fed. Rep. of Germany ... 423/321 S
493430 2/1976 U.S.S.R. ........................... 423/321 S

OTHER PUBLICATIONS

Niitsu et al., J. Inorg. Nucl. Chem. 1976, vol. 38, pp. 1054–1056 "Extraction of Phosphoric Acid From Various Aqueous Solutions with Trioctylphosphine Oxide".

*Primary Examiner*—Gregory A. Heller

[57] ABSTRACT

A process is developed for producing phosphoric acid and phosphates from wet-process phosphoric acid. The crude acid is extracted with a waterimmiscible solvent mixture consisting of mixed trialkyl phosphine oxide and a diluent, wherein about $\frac{2}{3}$ $P_2O_5$ in the crude acid is extracted into solvent mixture and the balance remains in the raffinate. Pure phosphoric acid or phosphates are produced by stripping the loaded solvent with appropriate aqueous phase and secondary calcium phosphate fertilizer is obtained by neutralizing the raffinate with calcium carbonate.

13 Claims, 1 Drawing Sheet

PROCESS FOR PRODUCING PHOSPHORIC ACID AND/OR PHOSPHATES FROM WET-PROCESS PHOSPHORIC ACID AND AN EXTRACTANT THEREIN

This invention relates to a process for producing pure phosphoric acid and/or phosphates by extracting wet-process phosphoric acid, and a new extractant used therein.

It is well known that there are varying quantities of dissolved and suspended impurities such as calcium, iron, silica, aluminum, fluorine and magnesium etc. in wet-process phosphoric acid. An extensive literature on removing the aforesaid impurities efficiently and economically for producing pure phosphoric acid and salts thereof both in study and industrial practice is available. One method of reducing these impurity levels is to extract $P_2O_5$ from wet-process phosphoric acid into an appropriate organic solvent, which is then stripped by pure water, alkali solution or ammonia according to intended products. The method of solvent extraction has been proved acceptable and efficient.

Up to now, extractants for the above purpose could be classified into groups: (1) alcohols, usually monohydroxy alcohols having four to eight carbon atoms such as butanol, i-amyeol, hexanol, heptanol or octanol etc.; (2) trialkyl phosphates, such as tributyl phosphate (TBP); (3) mixtures composed of different kinds of extractants such as the mixture consisting of alcohol, ketone and ether and the mixtures of phosphoryl-containing compounds and amines.

In early U.S. patents (U.S. Pat. Nos. 1,929,441, 1,929,442 and 1,929,443), C. H. Milligan proposed alcohols as extractants. In 1957, A. M. Baniel and R. Blumberg in Israel Pat. Nos. 9,539 and 9,660 suggested n-butyl alcohol as extractant. And later, many kinds of extractants for phosphoric acid have been published in order to improve the extracting effect. DEA Nos. 2,822,303 and 2,356,881 and U.S. Pat. No. 4,024,225 disclosed alcohol, ketone and ether respectively. All the said extractants, however, are soluble in water to a varying extent, so that an expensive recovery system of the appropriate solvent is necessary.

U.S. Pat. No. 3,438,764 reported organic sulfoxides and USSR No. 492,481 the mixture of TBP and petroleum sulfoxide for the same purpose. Unfortunately also here solvent recovery is needed, due to its considerable solubility in water.

TBP was selected for extracting wet-process phosphoric acid in USSR No. 710,925. And the mixture of TBP, trialkylamine and alcohol was used by USSR No. 596,542. In USSR No. 856,979, an extractant consisting of trialkyl phosphine oxides, trialkylamine and styrene copolymer was put forward. Although amine can raise the extraction efficiency, the use of it may lead to formation of emulsions during the process. And its unknown toxic property limits the production of food grade phosphates.

The use of pure trioctylphosphine oxide (TOPO) for the mentioned process has been studied in the laboratory. As for its difficult preparing method and high cost thereof, it is hard to say whether there is anything commercially valuable in it.

The object of the present invention is to provide a process and an extractant of the abovementioned kind which make solvent recovery unnecessary, avoid emulsion formation and toxicity problems and are highly selective and efficient at low cost.

According to the invention this task is solved by a process of the abovementioned kind which is characterized in that the wet-process phosphoric acid is extracted with a water-immiscible solvent mixture comprising a mixture of trialkyl phosphine oxides as extractant and a suitable water-immiscible diluent to form a loaded solvent mixture phase and a raffinate phase.

The extractant according to the invention for producing pure phosphoric acid and/or phosphates is characterized by mixed trialkyl phosphine oxides (HTRPO) having the following formula:

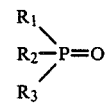

wherein $R_1$, $R_2$ and $R_3$ are same or different alkyl groups of 5 to 9 carbon atoms and the total number of carbon atoms per molecule is from 15 to 27.

Further preferred embodiments of the invention can be seen from the respective subclaims.

In other words, in a preferred embodiment, the invention provides a process for making pure phosphoric acid and/or phosphates from wet-process phosphoric acid, which comprises (1) extracting about two-thirds of $P_2O_5$ from the crude acid with a water-immiscible solvent mixture consisting of a mixture of trialkyl phosphine oxides and a suitable water-immiscible diluent, then (2) stripping the loaded solvent mixture with pure water, an alkali solution or gaseous ammonia to produce corresponding phosphoric acid in high purity or phosphates both for high grade fertilizers and for food and pharmaceutical uses, and (3) neutralizing the raffinate containing about one-third of the remaining $P_2O_5$ with calcium carbonate to make precipitated calcium hydrogen phosphate as common fertilizer.

Another result of the invention is to provide a new type of extractant for extracting phosphoric acid, which is a mixture of trialkyl phosphine oxides, particularly the mixed trialkyl phosphine oxides (HTRPO). The mixed trialkyl phosphine oxides has a promising trend towards commercializing, for its high selectivity, low solubility in water, high extraction efficiency and simple preparing process, all of which result in low cost.

The objects and advantages of the present invention will be further understood through following description and attached drawing, wherein figure of the drawing is a schematic flow diagram of an example of the basic process.

The crude acid is fed by line 1 to extractor 2, and the loaded organic phase by line 3 subsequently enters into stripper 4 to which pure water, alkaline solution or gaseous ammonia is introduced through line 6, with inorganic phase out by line 7 and stripped organic solvent by line 5 returning to the extractor 2 as recycling extractant. The raffinate from extractor 2 by line 8 and calcium carbonate by line 10 are fed into digester 9 separately. After neutralization in digester 9, the precipitate of phosphate of calcium and partial impurities is separated from the mother liquor and discharged through line 12, and the clear mother liquid is drawn off through line 11.

The wet-process phosphoric acid from decomposition of phosphate rock with sulfuric acid is used as a starting material in the present invention in which the concentration of $P_2O_5$ is from 5 to 40% by weight. The crude acid is contacted with a water-immiscible solvent mixture consisting of extractant and diluent in counter-current flow, while about ⅔ of $P_2O_5$ in the acid is extracted into the solvent mixture, and the balance of about ⅓ of $P_2O_5$ remains in the raffinate.

The one used here is a new type of extractant disclosed by the invention. That is a mixture of trialkyl phosphine oxides, and preferentially is the mixed trialkyl phosphine oxides (HTRPO) which is a mixture having the following formula:

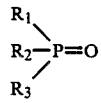

wherein $R_1$, $R_2$, $R_3$ are same or different alkyl groups with 5 to 9 carbon atoms respectively, and the total number of carbon atoms per molecule is from 15 to 27. The average molecular weight of the mixed trialkyl phosphine oxides is 312. It is a red-brown liquid and has excellent selectivity. This means that its extracting ability for phosphoric acid is higher than that for the impurities. Hence, most of the impurities remain in raffinate during the extracting process. The loaded-solvent, essentially free of impurities, is adapted for preparing pure phosphoric acid and high grade phosphates, especially dihydric potassium phosphate and dihydric ammonia phosphate. A comparison of selectivity coefficient for the mixed trialkyl phosphine oxides, TBP and trioctyl phosphine oxide (TOPO) is shown in Table 1, from which it is clear that the selectivity of the mixed trialkyl phosphine oxides is better than that of a single trialkyl phosphine oxide. Another feature of the mixed trialkyl phosphine oxides is its low solubility in water. While diluted with 40% kerosine, its solubility in water is only 90 PPM, much lower than that of TBP (380 PPM) or other adopted monohydroxy alcohols under the same diluting conditions. The process is hence simplified, for no recovery system for solvent has to be used. Besides, the extracting ability of the mixed trialkyl phosphine oxides is also good, as it has a high distribution coefficient (listed in Table 2). Compared with other extractants such as TBP and alcohols, higher recovery for phosphoric acid with less theoretical extraction stages can be obtained.

TABLE 1

| Composition of solvent mixture (60% kerosine by volume) | selectivity coefficient (to $Mg^{++}$) |
|---|---|
| 40% HTRPO | 4.5 |
| 40% TOPO | 3.3 |
| 40% TBP | 2.1 |

The diluents proposed in the present invention can be selected from aliphatic and aromatic hydrocarbons or paraffin oils, and kerosine is preferred. As for the reason of physical property, a high proportion of extractant may increase difficulties in stripping. Consequently the ratio of extractant to diluent should be a proper value. The chosen proportion by volume of extractant to diluent is from 5:1 to 1:5, preferably 3:2.

By adjusting the ratio of solvent mixture to crude acid by volume which is 1:1 to 4:1 and extraction stage in the extraction step, about ⅔ of $P_2O_5$ can be taken out from the crude acid. It is preferable to use a phase ratio between 1.5:1 and 2.5:1.

The extraction is operated at a temperature ranging from 5° to 35° C., preferably 25° C.

The contacting time in extraction is from 1 to 10 minutes.

The loaded solvent from extraction step is then stripped with pure water, aqueous alkali solution or gaseous ammonia in conformity with production purposes. When stripped with pure water for producing pure phosphoric acid, the temperature is from 50° to 90° C., preferably from 70° to 80° C.; when stripped with an alkali solution such as potassium hydroxide for producing high purity $KH_2PO_4$, it is operated at ambient temperature; when stripped with ammonia for producing pure dihydric ammonia phosphate, the temperature is from 20° to 60° C. The water-immiscible organic phase from stripping step is recycled to the extraction step as extractant.

The raffinate containing about ⅓ of the $P_2O_5$ remaining from the extraction step is neutralized with calcium carbonate until all the $P_2O_5$ is exhausted, and the formed secondary calcium phosphate ($CaHPO_4.2H_2O$), i.e. precipitated phosphate, precipitates with impurities from the raffinate. The small amounts of Fe, Ca, Mg, Al and F etc. in it are of benefit to the growth of plants, and the product can be used as cheap common fertilizer. So much less polluting effluent would have to be treated and discharged.

The overall percentage recovery of $P_2O_5$ in this process is as high as 98% or more.

It should be concluded from the above statement that the process of the invention is characterized by its high recovery ratio, simple process, less capital investment and less polluting problem. So it is economically valuable to commercialize the process.

The mixed phosphine oxides (HTRPO) can be prepared by following methods: (1) a mixture of monohydroxy alcohols of 5 to 9 carbon atoms having boiling point from 160° to 190° C. reacts with iodine first, forming alkyl iodides. These then react with red phosphorus and nitric acid, followed by collecting fractions of the resulting compounds by vacuum distillation within a range of temperature from 160° to 260° C. under 110 to 120 mmHg of absolute pressure as the mixed trialkyl phosphine oxides. (2) The mixed monohydroxy alcohols as stated in method 1 react with chlorinated sulfoxide first, forming alkyl halides. These then react with magnesium to produce Grinnard reagent, which is further treated with trichloride phosphorine oxide, followed by collecting fractions of the resulting compounds by vacuum distillation at temperature from 160° to 260° C. under 110 mmHg of absolute pressure as the mixed trialkyl phosphine oxides.

Method 2 is simple and does not have to consume red phosphorus and iodine, both of which are not easy to recover. As a result, the production cost is lower than that by method 1.

The mixed trialkyl phosphine oxides produced by either of the mentioned methods is a red-brown liquid at room temperature. It is a mixture of trialkyl phosphine oxides of 15 to 27 carbon atoms, having average molecular weight of 312.

The composition of the aforesaid mixture of monohydroxy alcohols is as follows: $C_5H_{11}OH$ 5–25%, $C_6H_{13}OH$ 30–40%, $C_7H_{15}OH$ 20–40%, $C_8H_{17}OH$ 5–15% and $C_9H_{19}OH$ 5–15%.

The starting material for preparing the mixed trialkyl phosphine oxides (HTRPO) can be chosen from the by-product of high-grade lubricant production. Besides its cheap price, the produced HTRPO in mixed form needs no further purification. Consequently the cost of the mixed trialkyl phosphine oxides is much lower than that of a single trialkyl phosphine oxide. Compared with trioctyl phosphine oxide (TOPO), the cost is only 5% of TOPO's. It is one of the main objects of the invention to use the mixed trialkyl phosphine oxides as extractant.

The invention is described in further details in the following examples.

EXAMPLE 1

100 ml crude phosphoric acid containing 18.6% $P_2O_5$ was placed in a separating funnel. Using kerosine as diluent, the acid was extracted at temperature of 30° C. by HTRPO, TBP and isoamyl alcohol respectively with 1 weight ratio of the solvent mixture to the crude acid and 5 minutes of contacting time. Table 2 below illustrates the distribution coefficients of phosphoric acid at different proportions of extractant to diluent.

TABLE 2

| composition of solvent mixture (volume %) | distribution coefficient |
|---|---|
| 40% HTRPO + 60% kerosine | 0.23 |
| 60% HTRPO + 40% kerosine | 0.32 |
| 80% TBP + 20% kerosine | 0.19 |
| 100% TBP | 0.26 |
| 100% isoamyl alcohol | 0.03 |

EXAMPLE 2

According to the flow sheet in the drawing, the crude phosphoric acid containing 19.67% $P_2O_5$ (or 240 g/l $P_2O_5$), 0.28%, $Fe_2O_3$, 0.03% $Al_2O_3$, 0.66% CaO, 0.272% MgO and 0.6% F by weight was first introduced into extractor 2 and was extracted by a solvent mixture consisting of 60% by volume of the mixed trialkyl phosphine oxides and 40% by volume of kerosine at 25° C. The flow rates of the acid and the solvent mixture are 3.96 l/hr and 2.64 l/hr respectively. The loaded solvent mixture was then stripped by pure water with a flow rate of 1.32 l/hr in stripper 4 at 80° C. The aqueous phase from bottom of the stripper was purified phosphoric acid containing 260 g/l of $P_2O_5$. The raffinate containing 96 g/l $P_2O_5$ from extractor 2 was then reacted with suspended calcium carbonate solution in digester 9. After the reactants separated, secondary calcium phosphate containing 27.7% $P_2O_5$ with impurities of 2.72% F, 3.41% Mg, 1.83% Fe and 0.66% Al by weight was obtained. The organic solvent from the stripper was recycled to extractor 2. The said extractor and stripper are all mixer-settlers with dimensions of 10×10×11 cm and 10×30×12 cm respectively. The purified phosphoric acid contained by weight 21.3% $P_2O_5$, 0.5% F, 0.17% CaO, 0.38% MgO and 0.5% suspended materials.

EXAMPLE 3

As described in Example 2 and the drawing, the loaded solvent mixture was stripped by an aqueous solution of KOH in stripper 4, during which the value of PH was controlled at about 4.5. The aqueous phase from stripper 4 was then evaporated, scrubbed and dried in succession to yield product $KH_2PO_4$. The purity of the product was over 99.5% with impurities of 0.017% MgO, 0.7% $Fe_2O_3$ and 0.18% F by weight. The data conform to the State Standards of China GB 1274-77, which is the standard for the first grade pharmaceuticals.

EXAMPLE 4

As described in Example 2 and FIG. 1, the loaded solvent mixture from extractor 2 was stripped with gaseous ammonia in stripper 4, during the process, the value of PH was adjusted to 7 and white crystals were formed immediately. The crystals were then washed free from the solvent adhered to the surface of it with ethanol. Upon analysis, the content of $NH_4H_2PO_4$ was more than 99%, and $SO_4^=$ and Fe were 0.01% and 0.003% by weight respectively, which meet the demands of HG 3-1064-77 of The Code of Ministry of Chemical Industry of China.

EXAMPLE 5

1 Kg mixed alcohols, the by-product from high-grade lubricant production, was distilled in a distillating still, collecting 0.83 Kg fraction at temperature from 186° to 190° C. The fraction was put into a reactor. When the temperature reached 120° to 125° C., 1.10 Kg iodine of 995 purity was added, half an hour later, adding 0.6 Kg red phosphorus and maintaining the reaction at 70° C. for another half an hour, producing trialkyl phosphine iodide complex ($R_3PI_2.I$). The $R_3PI_2.I$, 1 Kg sodium hydroxide (400 g/l NaOH) and 500 ml nitric acid (500 g/l $HNO_3$) were added to hydrolyzer to carry out hydrolysis. Through distillating the hydrolyzat under 110 mmHg absolute pressure, 0.74 Kg fraction was collected at temperature of 160° to 260° C. The infra-red spectra and element analysis showed that the fraction was a mixture of trialkyl phosphine oxides containing 15 to 27 carbon atoms. And its average molecular weight is 312.

EXAMPLE 6

0.83 Kg distilled mixed alcohols as quoted in Example 5 was reacted with 1 Kg chlorinated sulfoxide in a reactor, forming 0.85 Kg of alkyl chlorides. The latter was reacted with 0.3 Kg of magnesium powder and 1 Kg ethyl ether as solvent for half an hour, then adding 1 Kg trichlorine phosphine oxide for another one hour of reacting. Finally the resulting compounds was distilled under 110 mmHg absolute pressure, collecting 0.81 Kg fraction at the range of temperature from 160° to 200° C., which was the mixed trialkyl phosphine oxide (HTRPO) in accordance with requirements of the invention. Its average molecular weight was 312.

The aforementioned (Examples 5 and 6) methods to produce the extractant according to the invention are useful even without relation to the process for producing phosphoric acid and/or phosphates according to this invention.

We claim:

1. A process for producing pure phosphoric acid by extracting wet-process phosphoric acid chracterised in that the wet-process phosphoric acid is extracted at a temperature ranging from 5° to 35° C. by contacting with a water-immiscible solvent mixture consisting of a mixture of trialkyl phosphine oxides as extractant and a suitable water-immiscible diluent, adjusting the volume ratio of the solvent mixture to the said acid in the range of 1:1 to 4:1, and the ratio of extractant to diluent in the range from 5:1 to 1:5, contacting the solvent mixture with the said acid for from about 1 to 10 minutes to form a loaded solvent mixture phase and a raffinate phase, and stripping the loaded solvent to produce the pure phosphoric acid.

2. A process according to claim 1, characterised in that the extractant is mixed trialkyl phosphine oxides (HTRPO) which is a mixture having the following formula:

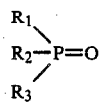

wherein $R_1$, $R_2$ and $R_3$ are the same or different alkyl groups of 5 to 9 carbon atoms and the total number of carbon atoms per molecule is from 15 to 27.

3. A process according to claim 1, characterised in that the said ratio is adjusted within said range to enable about two-thirds of $P_2O_5$ to be extracted from the wet-process phosphoric acid with the other one-third of $P_2O_5$ remaining in the raffinate.

4. A process according to claim 2, characterised in that the said raffinate is neutralized by calcium carbonate to produce secondary calcium phosphate.

5. A process according to claim 2, characterised in that the said diluent comprises aliphatic hydrocarbons, aromatic hydrocarbons, paraffin oils and/or kerosine.

6. A process according to claim 1, characterised in that the ratio of extractant to diluent by volume is about 3:2.

7. A process according to claim 1, characterized in that the ratio of the solvent mixture to the wet-process phosphoric acid by volume is from 1.5:1 to 2.5:1.

8. A process according to claim 1, characterised in that the process of extraction is operated at a temperature of about 25° C.

9. A process according to claim 1, characterised in that the concentration of the wet-process phosphoric acid is 5 to 40% $P_2O_5$ by weight.

10. A process according to claim 1, characterised in that the loaded solvent mixture is stripped with pure water at a temperature from 50° to 90° C. to recover phosphoric acid.

11. A process according to claim 1, characterised in that the loaded solvent mixture is stripped with aqueous solution of alkali at ambient temperature to produce alkali metal phosphates.

12. A process according to claim 11, characterised in that the loaded solvent mixture is stripped with an aqueous solution of potassium hydroxide to produce dihydric potassium phosphate.

13. A process according to claim 1, characterised in that the loaded solvent mixture is stripped with sufficient gaseous ammonia at a temperature from 20° to 60° C. to produce dihydric ammonium phosphate.

* * * * *